Figure 1:
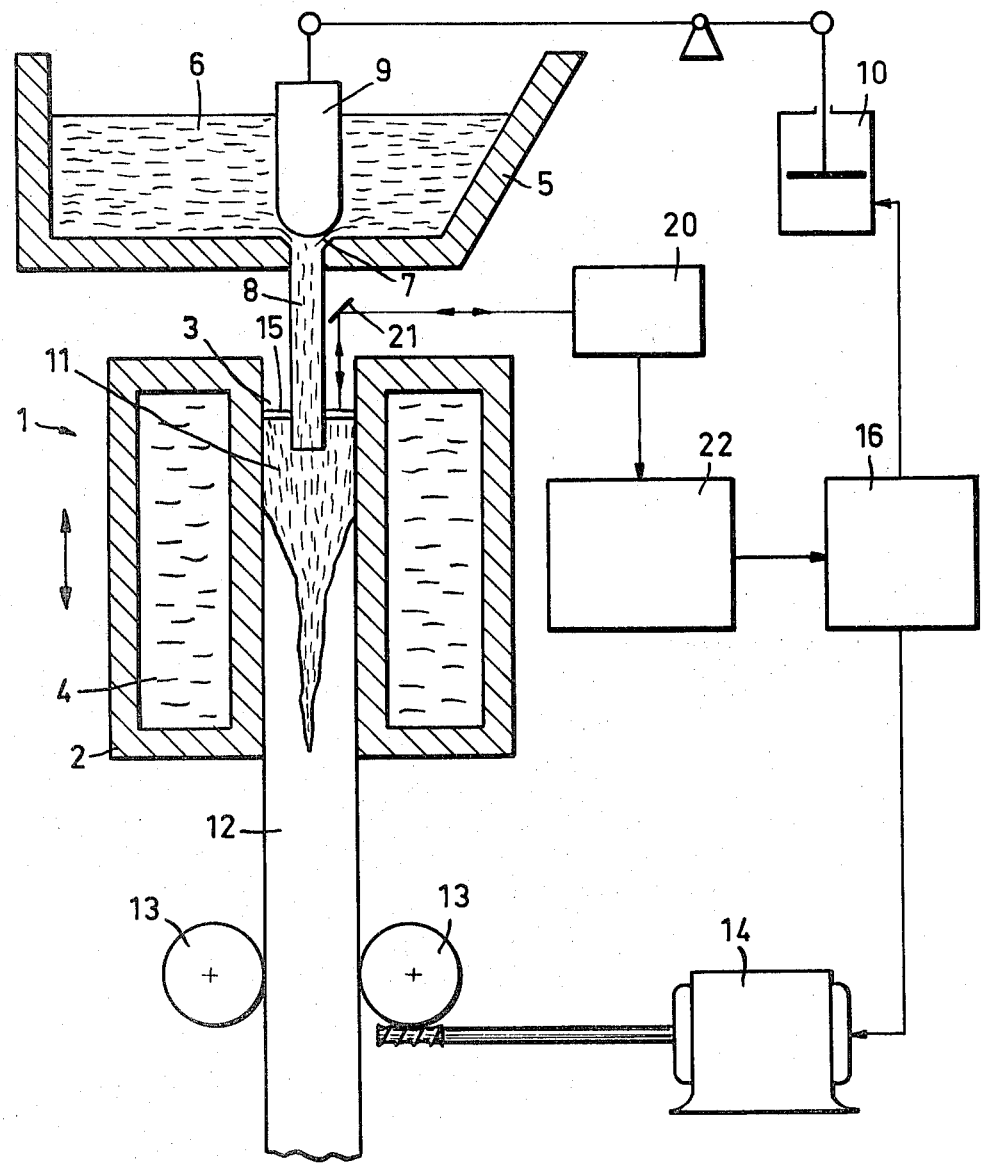

United States Patent [19]

Kompa

[11] 4,420,250
[45] Dec. 13, 1983

[54] ARRANGEMENT FOR MEASURING THE BATH LEVEL IN A CONTINUOUS CASTING APPARATUS

[75] Inventor: Günter Kompa, Schopfheim, Fed. Rep. of Germany

[73] Assignee: Endress u. Hauser GmbH u. Co., Maulburg, Fed. Rep. of Germany

[21] Appl. No.: 172,157

[22] Filed: Jul. 25, 1980

[30] Foreign Application Priority Data

Aug. 1, 1979 [DE] Fed. Rep. of Germany ....... 2931199

[51] Int. Cl.³ .......................... G01C 3/08; G01F 23/00
[52] U.S. Cl. .......................................... 356/5; 73/293; 356/4
[58] Field of Search ................ 356/4, 5, 28.5; 73/293, 73/291, 308, 314

[56] References Cited

U.S. PATENT DOCUMENTS

| 3,272,174 | 9/1966 | Pribonie ................................. 340/59 |
| 3,305,689 | 2/1967 | Leavy, Jr. et al. .................. 250/227 |
| 3,428,815 | 2/1969 | Thompson ............................. 356/5 |
| 3,574,650 | 4/1971 | House ..................................... 118/665 |
| 3,610,755 | 10/1971 | Wieberger et al. ..................... 356/4 |
| 3,615,135 | 10/1971 | Frazer .................................... 356/29 |
| 3,728,026 | 4/1973 | Idestrom et al. ....................... 356/5 |
| 4,006,988 | 2/1977 | Tamm .................................... 356/4 |
| 4,108,551 | 8/1978 | Weber .................................... 356/4 |

FOREIGN PATENT DOCUMENTS

| 14301 | 8/1980 | European Pat. Off. ................. 356/1 |
| 2305036 | 10/1974 | Fed. Rep. of Germany .......... 356/5 |
| 2438160 | 2/1976 | Fed. Rep. of Germany ........ 73/293 |
| 591682 | 9/1977 | Switzerland .......................... 73/293 |

Primary Examiner—S. C. Buczinski
Attorney, Agent, or Firm—Gerald J. Ferguson, Jr.; Joseph J. Baker

[57] ABSTRACT

A method of measuring the bath level in a cool tubular mould utilized in a continuous casting process where a melt of metal to be cast is discharged from a container therefor into the mould via an immersion tube vertically extending into a bore through the mould to thereby establish the bath, there being an annular space between the immersion tube and the wall of the bore, and where the melt is soldified by the cooled mould and continuously withdrawn therefrom as a solidified bar. The method includes the steps of transmitting a series of light pulses from a transmission point in a first direction through an elongated tube horizontally disposed above the mould to the side thereof having a right-angle bend therein to a common deflecting mirror disposed at the bend; deflecting the light pulses from the common deflecting mirror into the annular space between the immersion tube and mould bore in a direction parallel to the vertically extending immersion tube and onto the surface of the bath; reflecting pulses from the bath surface through the annular space back to the common deflecting mirror; deflecting the reflected pulses from the mirror through the tube in a direction opposite to the first direction to a receiving point; electrically measuring the time interval between the instant of transmission of each transmitted light pulse and the instant of receipt of the corresponding echo light pulse to determine the bath level.

1 Claim, 3 Drawing Figures

ARRANGEMENT FOR MEASURING THE BATH LEVEL IN A CONTINUOUS CASTING APPARATUS

The invention relates to an arrangement for measuring the bath level in a casting apparatus, in particular in the mould of a continuous casting apparatus.

The continuous casting of steel has become of increasing significance in recent years. Compared with conventional gravity casting it has substantial advantages, such as higher outputs, lower transformation costs, less operations, work reduction and uniform quality.

One of the most important requirements for reliable safe and productive operation of the continuous casting apparatus is the measurement and control of the level in the mould. If the bath level is too high there is a danger of the mould overflowing. If the bath level is too low there is a danger of the bar tearing because the cooling effect is inadequate and the solidified surface of the bar is too thin.

Both overflowing and tearing present operating disturbance involving high costs.

During the stationary operating condition the bath surface should be kept at constant level to obtain a homogeneous structure in the solidified bar and thus guarantee high steel quality.

Control of the bath level requires continuous measurement thereof during operation of the apparatus. This measurement must be carried out under difficult conditions. Firstly, the measuring means is exposed to very high temperatures and the danger of soiling. Secondly, the space available for the measurement is very restricted because the form passages of the mould often have a small cross-section which moreover is largely taken up by an immersion tube, although the measurement must take place over an adequate height range in the mould.

As is known from the article "Instrumentation and Automation of continuous Casting plant" by Hubert Hinkelmann in the "Siemens-Zeitschrift" 47 (1973), No. 2, pages 106 to 108, today mainly radioactive measuring techniques are used for measuring the bath level. For this purpose, at the level of the melt surface on one side of the mould a nuclear rod radiator is disposed and on the opposite side a scintillation counter. The rod radiator consists of a material such as Co 60 or Cs 137 emitting gamma quanta. The length of the radiator or emitter is adapted to the measuring range and is of the order of magnitude of 100 mm. The radiation quanta impinging on the scintillation counter per unit time are a function of the melt level.

A disadvantage of radiometric measuring techniques is that the statistical fluctuations of the quanta incident per unit time increase with the level so that a mean value formation of the detected pulse rate becomes indispensable. This requires however measuring times which, assuming spreads of up to 5% of the measuring range, are of the order of magnitude of one second. For reasons of automatic control such long time constants of the system are very unsuitable, particularly when with bars of small cross-sections and corresponding high drawing rates the time constants of the system on level changes must be kept very small to ensure reliable operation.

It is also disadvantageous that with radiometric measurement the control range is restricted to the rod length so that with conventional radiators the level control is possible in a stationary operating condition but the critical moment of initial pouring cannot be covered by the measuring technique consequently an initial control by hand is necessary. Admittedly, proposals have been made for covering the start of the casting in which a plurality of nuclear rod radiators are disposed one above the other in the mould wall; however, this considerably increases the technical expenditure.

The main disadvantage of the known arrangement is however the use of radioactive isotopes such as Co 60 and Cs 137 which because of the gamma radiation require special safety measures. After each casting operation the moulds are cleaned from the inside to prevent casting powder sticking to the inner wall of the mould. It may happen that the radiator is not disconnected, subjecting the personnel to increased radiation. The psychological effect of the radioactivity of the radiation source on the personnel should also not be underestimated.

It is an object of the invention to provide an arrangement with which the bath level in a casting apparatus, in particular in the mould of a continuous casting apparatus, can be measured rapidly and accurately over any desired measuring range in a completely harmless manner.

According to the invention, an arrangement for measuring the bath level in a casting apparatus, in particular in the mould of a continuous casting apparatus is characterized by an electrooptical range meter operating on the pulse travel time principle with light pulses and comprising a light pulse generator for transmitting transmitted light pulses and a photoelectric receiving transducer which converts received light pulses to electrical output signals, a means which directs the transmitted light pulses vertically from above onto the bath surface, a means which directs the echo light pulses reflected at the bath surface onto the photoelectric receiving transducer, and by an evaluating circuit connected to the light pulse generator and the photoelectric receiving transducer for measuring the time interval between the instant of the transmission of each transmitted light pulse and the instant of the receipt of the corresponding echo light pulse.

In the measuring arrangement according to the invention the measurement of the level is effected by means of light waves, i.e. without contact and with a completely harmless radiation. The actual range measuring apparatus may be disposed at any desired distance from the mould so that it is protected from the heat of the casting operation and other injurious effects. Since the measurement takes place with a light beam entering the mould vertically it is also possible with very narrow moulds over any height so that the initial casting operation can be completely controlled as well. A measurement can be carried out very accurately with great resolution power and the measurement result is obtained without delay.

Figure 2:
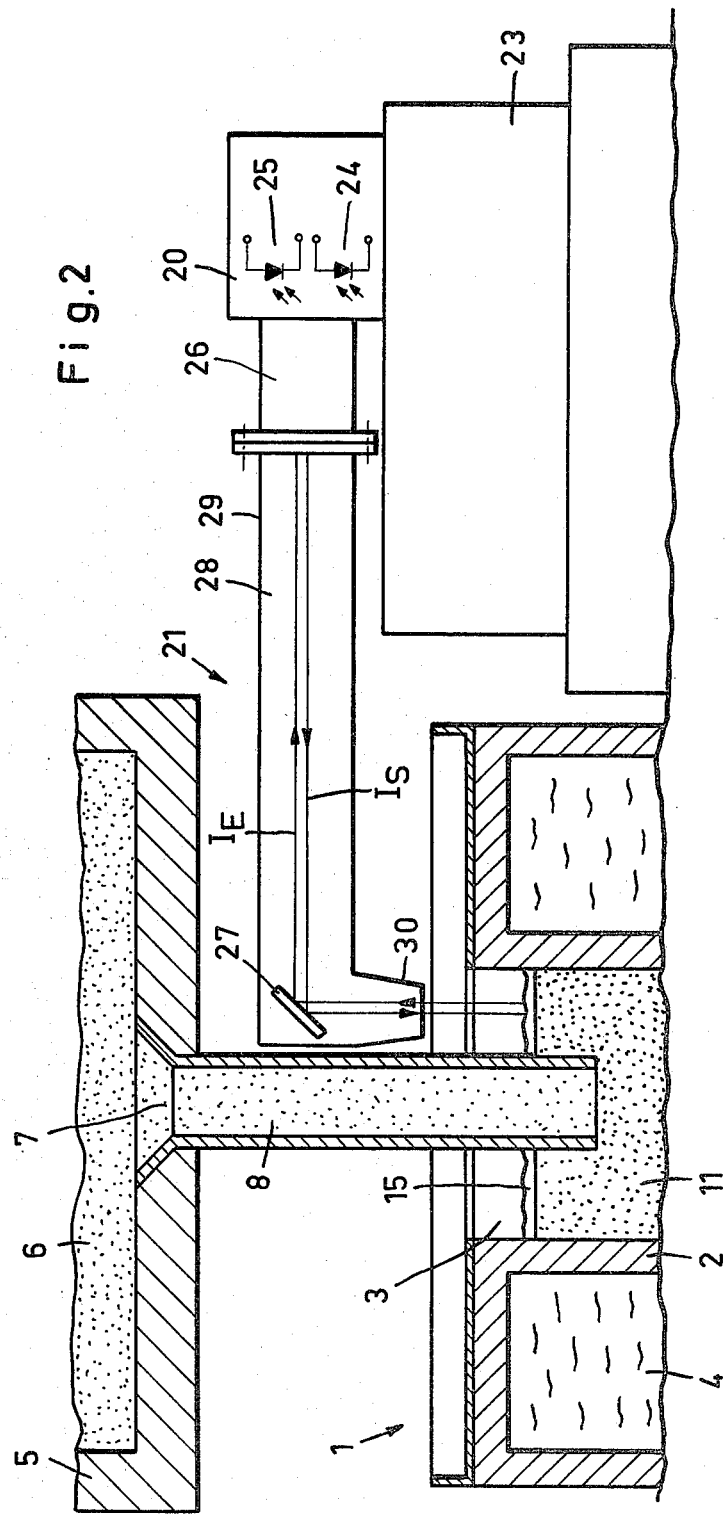
Figure 3:
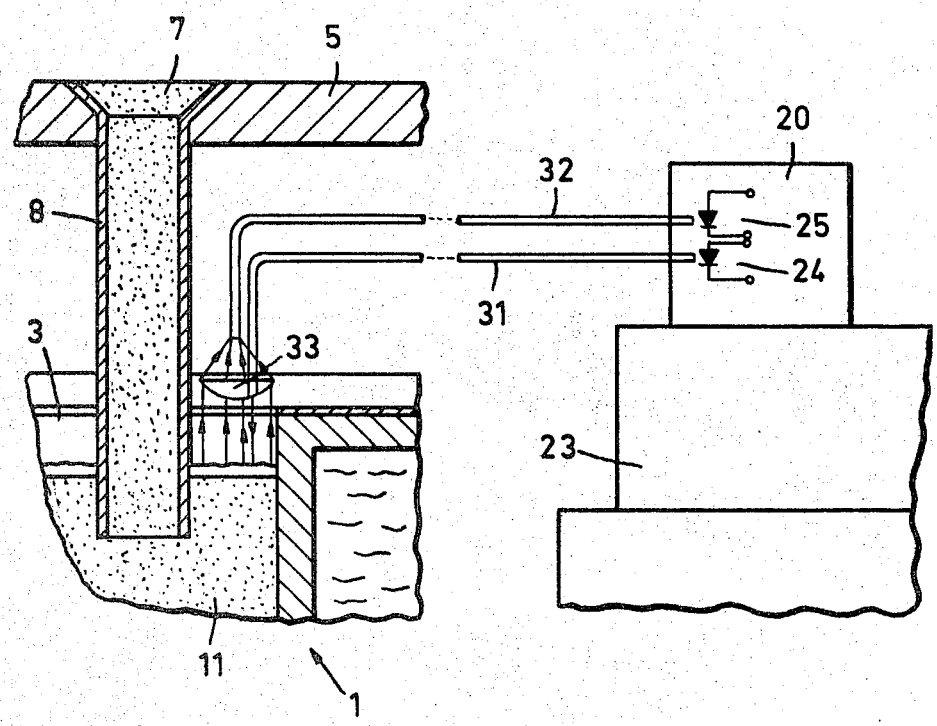

Other features and advantages of the invention will be apparent from the following description of the examples of embodiment with the aid of the drawings, wherein;

FIG. 1 is a schematic diagram of a continuous casting apparatus with the measuring arrangement according to the invention, FIG. 2 is an enlarged illustration of the measuring arrangement of FIG. 1 and FIG. 3 is another embodiment of the measuring arrangement according to the invention.

FIG. 1 shows diagramatically a continuous casting apparatus with a mould 1 and means for measuring and controlling the bath level in the mould. The mould 1 comprises a double-walled cylindrical housing 2 whose central passage 3 is open at the top and bottom and forms the casting mould. Cooling water flows through the annular cavity 4 of the housing. Above the mould 1 an intermediate container 5 is disposed which contains a supply 6 of the melt of the metal to be cast. Disposed at the bottom of the intermediate container 5 is a discharge nozzle 7 which is adjoined by an immersion tube 8 which projects downwardly into the form passage 3 of the mould 1. The melt can flow from the intermediate container 5 through the discharge nozzle 7 and the immersion tube 8 into the mould 1. The flow rate of the melt is varied wih the aid of a plug 9 disposed in the intermediate container 5 and cooperating with the discharge nozzle 7, said plug 9 being adjustable by means of an adjusting member 10.

The melt flowing through the discharge nozzle 7 and immersion tube 8 fills the form passage 3 of the mould 1 up to a certain level, thus forming the casting bath 11. The melt solidifies at the cool chilled mould walls relatively rapidly from the inside to the outside so that a relatively solid outer shell is formed whilst the interior of the bar remains liquid. To cast a continuous bar the bar 12 emerging at the lower end of the mould is withdrawn by means of drawing rolls 13 which are driven by a drive motor 14. To prevent the bar sticking to the mould the mould is given an alternating reciprocating vertical movement as indicated by a double arrow. A casting powder 15 thrown onto the surface of the bath 11 in the mould prevents heat radiation; it also serves in the liquid state as lubricant between the inner wall of the mould and the solidified bar.

One of the most important requirements for reliable and productive operation of the continuous casting system is the measurement control of the bath level, i.e. the surface of the bar 11 in the mould. If the level is too high there is a danger of the mould overflowing. If the level is too low there is a danger of the bar tearing because on leaving the mould the bar has not cooled adequately and the solidified shell of the bar is too thin. Both the overflowing and a tearing represent an interference in operation which involves high costs. Furthermore, during the stationary operating condition the bath level in the mould must be kept as exactly as possible constant to obtain a homogeneous structure in the solidified bar and thus a high quality of the bar.

There are two parameters for the control of the mould bath level: the withdrawal speed and the supply of the melt to the mould. The control of the withdrawal speed is effected by acting on the speed of rotation of the drive motor 14 and the control of the supply of the melt is effected by adjusting the plug 9 by means of the adjusting member 10. The adjustment quantities are furnished by a controller 16 which as controlled variable receives a signal indicating the level of the bath surface in the mould. To produce this signal the level of the bath in the mould must therefore be measured. The bath level is measured with the aid of an electrooptical range meter 20 which operates on the pulse travel time principle with light pulses. Such an electrooptical range meter emits in rapid succession transmission light pulses and receives the echo light pulses reflected at a target. An electronic evaluating circuit measures the time interval between each transmission light pulse and the corresponding echo light pulse and this interval is a measure of the distance between the range meter and the target. In the present case the transmission light pulses emitted by the electrooptical range meter 20 are directed with the aid of an optical deflecting means 21 vertically from above onto the surface of the bath 11 in the mould 1 and the echo pulses reflected from said surface are returned via the optical deflection means 21 to the range meter 20. The evaluating circuit 22 connected to the electrooptical range meter 20 measures the interval between the transmission of each transmitted light pulse and the receipt of the corresponding echo light pulse; this interval is proportional to the path covered by the light pulses between the range meter and the bath surface in both directions. On the basis of this time measurement the evaluating circuit 22 supplies to the controller 16 a signal which is a measure of the level of the bath surface in the mould 1.

Since the path covered by the light pulses between the range meter and the bath surface is relatively short an electrooptical range meter 20 must be used which is suitable for measuring short distances. Furthermore, to enable the level of the bath surface to be measured and controlled with adequate accuracy the electrooptical range meter 20 must be so designed that it has high resolving power, i.e. can distinguish between very small distance differences. These conditions are fulfilled for example particularly well by an electrooptical range meter which is the subject of elder patent application No. P 29 08 854.8, which was not prior published.

FIG. 2 shows an embodiment of the arrangement for measuring the bath level in detail. The electrooptical range meter 20 is mounted on a base 23 laterally adjacent the mould 1 but above the height of the upper edge of the mould. It comprises a light pulse generator 24, for example a laser diode, and a photoelectric transducer 25, for example a photodiode which converts incident light pulses to electrical signals. Furthermore, the range meter also includes of course the electrical control and driver circuits necessary for driving the light pulse generator 24, which for simplification are not illustrated. An optical system 26 ensures that the light pulses are transmitted in the form of a parallel light beam with small diameter in a horizontal direction to the mould 1, as illustrated by the beam path $I_S$. The optical deflecting means 21 is formed in this case by a deflection mirror 27 which is disposed at an inclination of 45° to the beam direction above the form passage 3 of the mould 1 so that it deflects the transmitted pulses vertically downwardly so that they impinge on the surface of the bath 11 in the mould 1. Part of the light of each transmitted light pulse reflected upwardly at the bath surface is received by the deflection mirror 27, deflected into the horizontal direction and returned as echo light pulse to the electrooptical range meter 20 as indicated by the beam path $I_E$. The optical system 26 collects the echo light pulses spread in a beam of relatively large cross-section and ensures that they are focused onto the photoelectric transducer 25.

The deflection mirror 27 consists preferably of a highly polished planar rectangular or circular steel plate. However, other materials may also be used which have good reflecting properties and are heat resistant. The deflection mirror 27 is preferably planar; however, both for the transmitted beam path and the echo beam path separate mirrors with different curvatures may be used, for example a small plane mirror for the transmitted beam and a curved mirror for the echo beam which deflects the divergent rays reflected at the bath surface into a parallel beam.

To reduce the danger of soiling of the deflection mirror 27 the latter is preferably disposed at the knee of an angled tube 28 whose longer leg 29 directed towards the range meter 20 also encloses the optical system of the range meter 20 whilst the short leg 30 is directed towards the bath surface and is open at the bottom. This short leg 30 tapers conically downwardly.

FIG. 3 shows diagramatically another embodiment of the measuring arrangement in which the optical deflection means is formed by two optical waveguides 31, 32 which are bent at an angle of 90°. Such an optical waveguide comprises in known manner a glass fibre or a glass fibre bundle. One end of the optical waveguide 31 is coupled to the light pulse generator 24; the other end of said waveguide is vertically above the bath surface so that the transmitted light pulses emerging therefrom are incident downwardly on the bath surface. The downwardly directed end of the optical waveguide 32 receives a part of the light reflected at the bath surface and transmits it as echo light pulses to the photoelectric transducer 25 coupled to the other end. To utilize as much as possible of the light reflected at the bath surface a collecting optical system 33 is preferably disposed above the bath surface and focuses the light collected onto the entrance of the optical waveguide 32. The transmission optical waveguide 31 may in this case be led through an opening in the collecting optical system 33.

I claim:

1. A method for measuring the bath level in a cooled, tubular mould utilized in a continuous casting process where a melt of metal to be cast is discharged from a container therefor into the mould via an immersion tube vertically extending into a bore through the mould to thereby establish the bath, there being an annular space between the immersion tube and the wall of the bore, and where the melt is solidified by the cooled mould and continuously withdrawn therefrom as a solidified bar, said method comprising the steps of transmitting a series of light pulses from a transmission point in a first direction through an elongated tube horizontally disposed above the mould to the side thereof having a right-angle bend therein to a common deflecting mirror disposed at the bend; deflecting the light pulses from the common deflecting mirror into said annular space between the immersion tube and mould bore in a direction parallel to the vertically extending immersion tube and onto the surface of the bath; reflecting pulses from said bath surface through said annular space back to said common deflecting mirror; deflecting the reflected pulses from said mirror through said tube in a direction opposite to said first direction to a receiving point; electrically measuring the time interval between the instant of transmission of each transmitted light pulse and the instant of receipt of the corresponding echo light pulse to determine said bath level.

* * * * *